US012326539B2

(12) United States Patent
Kao (10) Patent No.: US 12,326,539 B2
(45) Date of Patent: Jun. 10, 2025

(54) META-OPTICAL DEVICE FOR COLLIMATING AND DEFLECTING LIGHT BEAM

(71) Applicant: Wuyun Co., Inc., Taichung (TW)

(72) Inventor: Po-Sung Kao, Taichung (TW)

(73) Assignee: Wuyun Co., Inc., Taichung (TW)

( * ) Notice: Subject to any disclaimer, the term of this patent is extended or adjusted under 35 U.S.C. 154(b) by 743 days.

(21) Appl. No.: 17/564,982

(22) Filed: Dec. 29, 2021

(65) Prior Publication Data

US 2023/0021930 A1 Jan. 26, 2023

(30) Foreign Application Priority Data

Jul. 21, 2021 (TW) ................. 110126860

(51) Int. Cl.
*G02B 1/00* (2006.01)
*G02B 27/30* (2006.01)

(52) U.S. Cl.
CPC ............. *G02B 1/002* (2013.01); *G02B 27/30* (2013.01); *G02B 2207/101* (2013.01)

(58) Field of Classification Search
CPC ... G20B 1/002; G02B 27/30; G02B 2207/101
USPC .......................................... 359/505; 350/641
See application file for complete search history.

(56) References Cited

U.S. PATENT DOCUMENTS

| | | | | |
|---|---|---|---|---|
| 11,086,051 | B2* | 8/2021 | Tsai | G03H 1/0244 |
| 11,828,951 | B2* | 11/2023 | Kao | G02B 27/30 |
| 2013/0286633 | A1* | 10/2013 | Rodriguez | H01L 33/50 |
| | | | | 362/84 |
| 2015/0090862 | A1* | 4/2015 | Matsui | G02B 5/1876 |
| | | | | 359/356 |
| 2016/0306167 | A1* | 10/2016 | Mossberg | G02B 5/1866 |
| 2018/0275321 | A1* | 9/2018 | Kamali | G02B 27/4211 |
| 2019/0113727 | A1* | 4/2019 | Tamma | H01L 33/58 |
| 2019/0154877 | A1* | 5/2019 | Capasso | G02B 5/18 |
| 2020/0067278 | A1* | 2/2020 | Han | H01S 5/343 |
| 2020/0103722 | A1* | 4/2020 | Kim | G02F 1/133602 |
| 2021/0028332 | A1* | 1/2021 | Liu | G02B 1/005 |
| 2022/0247158 | A1* | 8/2022 | Gronenborn | G01B 11/2513 |
| 2023/0012003 | A1* | 1/2023 | Ma | G02B 1/002 |

FOREIGN PATENT DOCUMENTS

WO WO-2021025759 A1 * 2/2021 ............. G02B 1/002

* cited by examiner

*Primary Examiner* — Ricky D Shafer
(74) *Attorney, Agent, or Firm* — Blank Rome LLP (57) ABSTRACT

A meta-optical device for collimating and deflecting a light beam is provided to include a substrate assembly and at least one meta-optical array that is formed on the substrate assembly and that is disposed to receive at least one light beam. The at least one meta-optical array includes a plurality of nanostructures that are made in such a way that the at least one light beam is collimated and deflected after passing through the at least one meta-optical array.

9 Claims, 11 Drawing Sheets

META-OPTICAL DEVICE FOR COLLIMATING AND DEFLECTING LIGHT BEAM

CROSS-REFERENCE TO RELATED APPLICATION

This application claims priority of Taiwanese Invention patent application No. 110126860, filed on Jul. 21, 2021.

FIELD

The disclosure relates to a meta-optical device, and more particularly to a meta-optical device for collimating and deflecting a light beam.

BACKGROUND

Traditional optical systems are generally composed of multiple optical components or curved surfaces that occupy a certain amount of space. In order to make these optical components perform a specific function, the size of the optical system may be large. For example, prisms and lenses that occupy a certain amount of space are required to enable deflection of light beams.

In addition, when a radius of curvature of a curved surface is small, maintaining processing precision would be difficult in view of technical limitations on processing traditional optical components.

SUMMARY

Therefore, an object of the disclosure is to provide a meta-optical device that can be used for collimating and deflecting a light beam and that has a reduced size while maintaining good processing precision.

According to the disclosure, the meta-optical device includes a substrate assembly and N number of meta-optical array(s). The substrate assembly has a substrate assembly surface that extends in an X-Y plane defined by an X-axis extending in an X-direction and a Y-axis extending in a Y-direction. The X-direction and the Y-direction are perpendicular to each other. The meta-optical array(s) is (are) formed on the substrate assembly surface and is (are) disposed to receive N number of light beams, respectively, wherein N is a positive integer. Each of the meta-optical array(s) includes a plurality of nanostructures that are arranged in an array and that extend in a Z-direction in which a Z-axis extends and which is perpendicular to the substrate assembly surface. For an nth meta-optical array that is an nth one of the meta-optical array(s), that is disposed to receive an nth light beam which is an nth one of the light beam(s) and that manipulates the nth light beam into an nth imaging light beam, an origin of said $n^{th}$ meta-optical array is defined to be an intersection of an optical axis of the nth light beam and the nth meta-optical array, and each of the nanostructures thereof is configured to have a parameter $\Delta\varphi_n(x_n, y_n)$ relating to:

$$-\frac{2\pi}{\lambda_n}\left(\sqrt{x_n^2 + y_n^2 + f_n^2} - f_n - (x_n\cos\,\theta_n + y_n\sin\,\theta_n)\sin\,\gamma_n\right)$$

where n is a variable that takes on a positive integer value ranging from 1 to N, $x_n$ represents a distance between the nanostructure and the origin of the nth meta-optical array in the X-direction, $y_n$ represents a distance between the nanostructure and the origin of the nth meta-optical array in the Y-direction, $\Delta\varphi_n(x_n, y_n)$ represents a difference between a phase shift to be induced on the $n^{th}$ light beam by the nanostructure and a phase shift to be induced on the $n^{th}$ light beam by one of the nanostructures that is located at the origin of the $n^{th}$ meta-optical array, $\lambda_n$ represents an operating wavelength of the $n^{th}$ light beam, $f_n$ represents a focal length of the $n^{th}$ meta-optical array, $\theta_n$ represents an angle between the X-axis and a projection of the $n^{th}$ imaging light beam on the X-Y plane, and $\gamma_n$ represents an angle between the Z-axis and the $n^{th}$ imaging light beam.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate Corresponding or analogous elements, which may optionally have similar characteristics.

Figure 1:
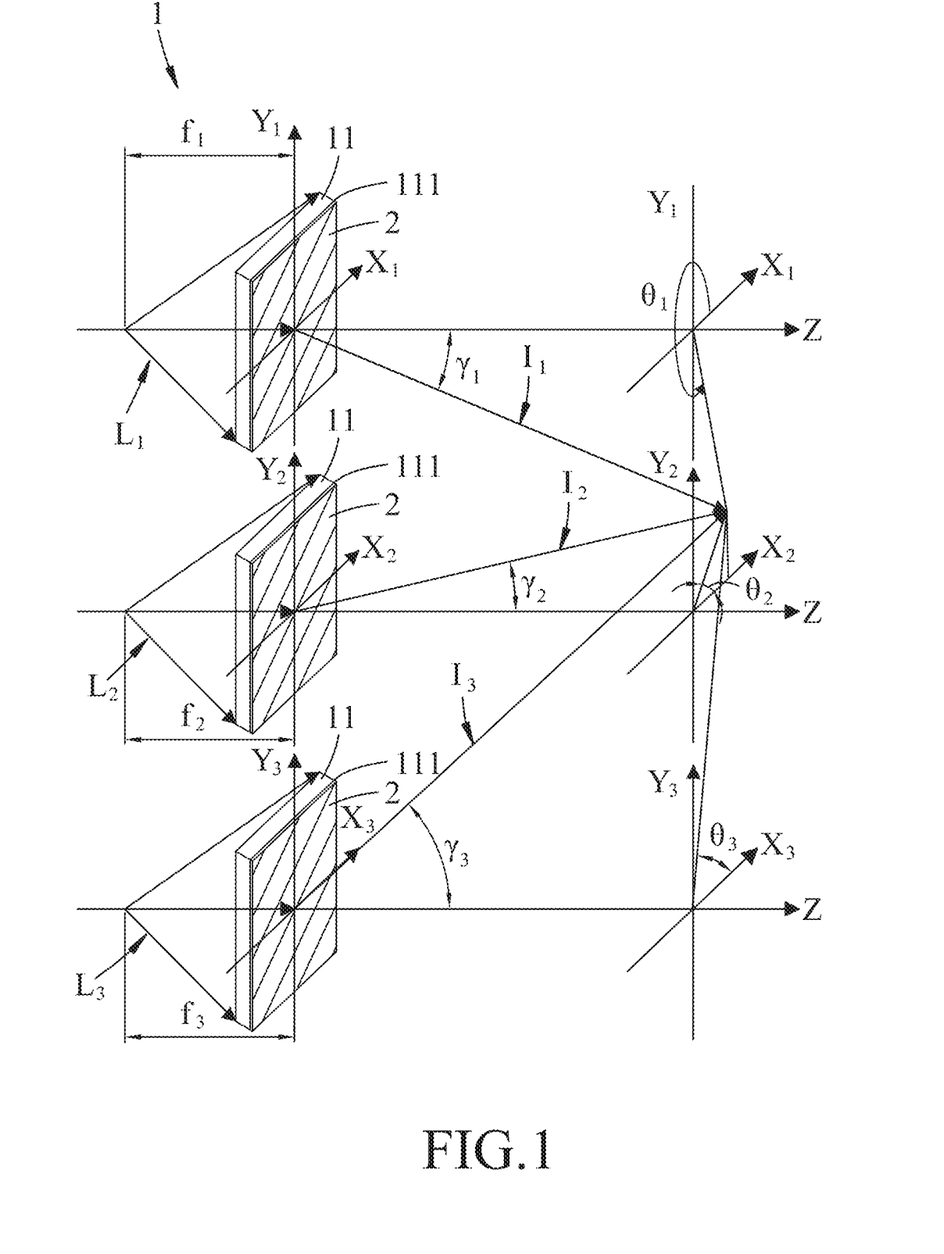
FIG. 1 is a schematic diagram illustrating an embodiment of a meta-optical device according to the disclosure.
Figure 2:
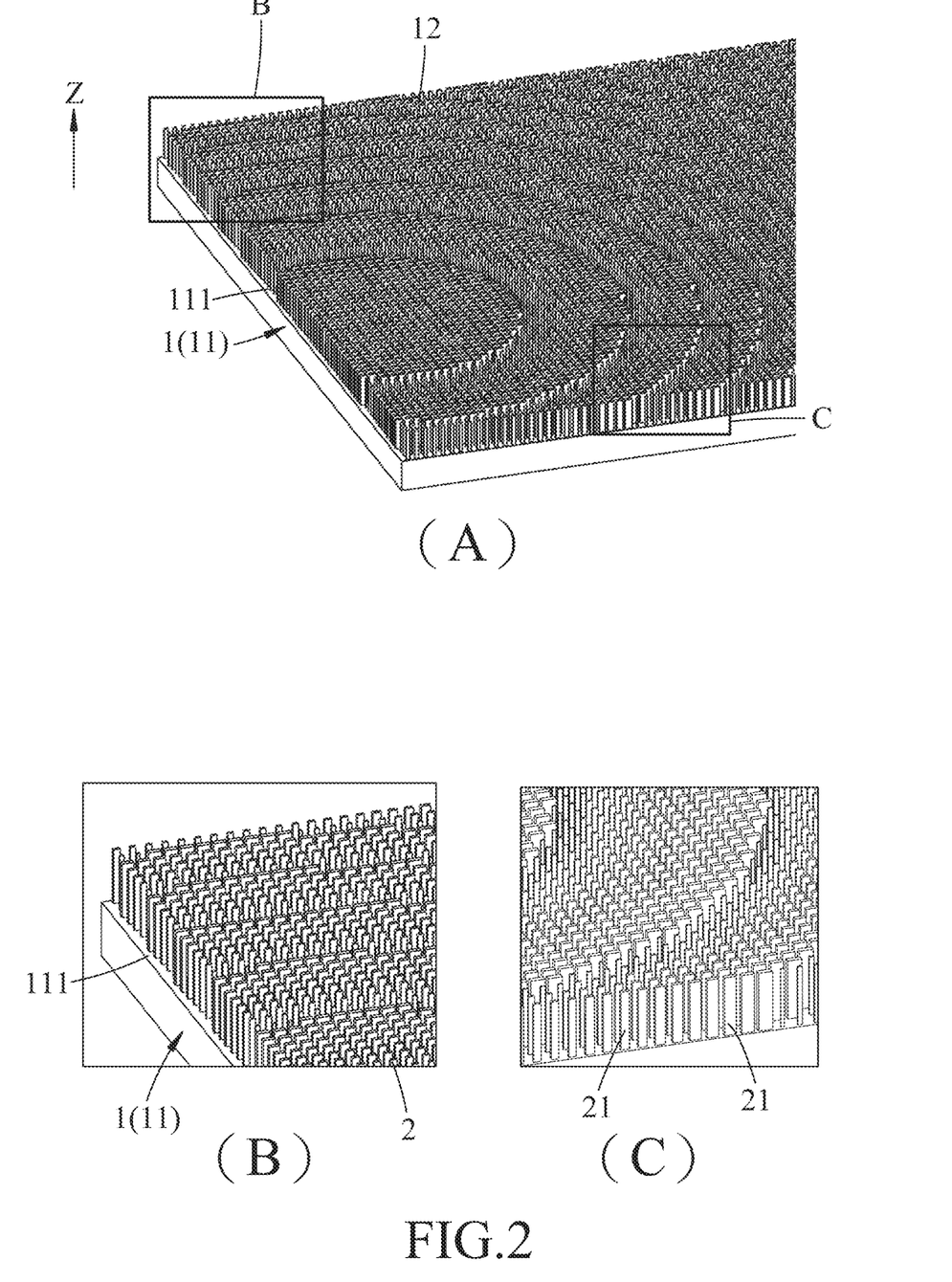
FIG. 2 is a fragmentary perspective view illustrating the embodiment, where part (B) is an enlarged view of a section B in part (A), and part (C) is an enlarged view of a section C in part (A)

Referring to FIGS. 1 and 2, an embodiment of a meta-optical device according to this disclosure is provided for collimating and deflecting N number of light beams (referred to as first to Nth light beams hereinafter), where N is a positive integer. In this embodiment, the meta-optical device may be a lens component used in an optical engine of a projector for collimating and deflecting the light beams (e.g., light beams of different colors) to the same spot. In some variations of this embodiment, the meta-optical device may be used in an optical engine for augmented reality (AR) and/or virtual reality (VR).

In some embodiments, the meta-optical device may be configured for collimating and deflecting a single light beam (i.e., N=1) to a desired spot.

The meta-optical device includes a substrate assembly 1 that has a substrate assembly surface, and N number of meta-optical arrays 2 that are formed on the substrate assembly surface and that are used to receive the N number of the light beams, respectively.

In some embodiments where N is not smaller than two, the substrate assembly includes N number of substrates. In the illustrative embodiment, N=3, and the substrate assembly 1 thus includes three substrates 11 that are made of $SiO_2$. In other embodiments, the substrates 11 may be made of other materials, such as optical glass, materials that include Si and/or Ge, other suitable materials, or any combination thereof, and this disclosure is not limited in this respect. Each of the substrates 11 has a substrate surface 111 that extends in an X-Y plane defined by an X-axis ($X_1$, $X_2$, $X_3$) extending in an X-direction and a Y-axis ($Y_1$, $Y_2$, $Y_3$) extending in a Y-direction, where the X-direction and the Y-direction are transverse or perpendicular to each other.

The meta-optical arrays 2 are respectively formed on the substrate surfaces 111 of the substrates 11, and are disposed to receive the first to $N^{th}$ light beams (e.g., the first light beam $L_1$, the second light beam $L_2$ and the third light beam $L_3$ in this embodiment), respectively. An $n^{th}$ one of the meta-optical arrays 2 (referred to as $n^{th}$ meta-optical array 2 hereinafter) receives an $n^{th}$ light beam, manipulates the $n^{th}$ light beam into an $n^{th}$ imaging light beam, and has an origin defined to be an intersection of an optical axis of the $n^{th}$ light beam and the $n^{th}$ meta-optical array, where n is a variable that takes on a positive integer value ranging from 1 to N (e.g., n=1, 2, 3 in this embodiment). The $n^{th}$ light beam enters and passes through a corresponding substrate 11 on which the $n^{th}$ meta-optical array 2 is formed from a surface opposite to the substrate surface 111 of the corresponding substrate 11, In other embodiments, the substrate assembly 1 may include only one substrate 11, and the meta-optical arrays 2 are formed on different parts of the substrate surface 111 of the substrate 11.

In this embodiment, the meta-optical arrays 2 are made of $TiO_2$, and the light beams may be, for example but not limited to, visible light, infrared, or light beams with other wavelengths. In other embodiments, the meta-optical arrays 2 may be made of other materials, such as GaN, GaP, AlAs, AlGaAs, Ge, ZnS, Si, $Si_3N_4$, other transmissive dielectrics having a high refractive index (e.g., greater than 1.8), or any combination thereof, and this disclosure is not limited in this respect.

Each of the meta-optical arrays 2 includes a plurality of nanostructures 21 that are arranged in an array, and each of the nanostructures 21 extends in a Z-direction in which a Z-axis extends and which is that is perpendicular to the substrate assembly surface (i.e., perpendicular to the X-direction and the Y-direction). When an incident light beam enters a nanostructure 21, the nanostructure 21 manipulates the incident light beam to output an imaging light beam component that has a phase different from the incident light beam. In other words, the nanostructure 21 induces a phase shift on the light beam, and the $n^{th}$ imaging light beam is a combination the imaging light beam components that respectively result from the nanostructures 21 of the $n^{th}$ meta-optical array 2 manipulating the $n^{th}$ light beam. Each of the nanostructures 21 of the $n^{th}$ meta-optical array 2 is configured to satisfy a phase difference equation (1) of:

$$\Delta\varphi_n(x_n, y_n) = -\frac{2\pi}{\lambda_n}\left(\sqrt{x_n^2 + y_n^2 + f_n^2} - f_n - (x_n\cos\theta_n + y_n\sin\theta_n)\sin\gamma_n\right) - \Delta\Phi_n(x_n, y_n)$$

where $x_n$ represents a distance between the nanostructure 21 and the origin (0, 0) of the $n^{th}$ meta-optical array 2 in the X-direction, $y_n$ represents a distance between the nanostructure 21 and the origin of the $n^{th}$ meta-optical array 2 in the Y-direction, $\Delta\varphi_n(x_n, y_n)$ represents a difference between a phase shift to be induced on the $n^{th}$ light beam by the nanostructure 21 and a phase shift to be induced on the $n^{th}$ light beam by one of the nanostructures 21 that is located at the origin of the $n^{th}$ meta-optical array 2 (hereinafter shortened to "the nanostructure 21 at the origin of the $n^{th}$ meta-optical array 2") (thus, $\Delta\varphi_n(0,0)=0$), $\lambda_n$ represents an operating wavelength of the $n^{th}$ light beam, $f_n$ represents focal length of the $n^{th}$ meta-optical array 2, $\theta_n$ represents an angle between the X-axis and a projection of an $n^{th}$ imaging light beam on the X-Y plane, $\gamma_n$ represents an angle between the Z-axis and the $n^{th}$ imaging light beam, and $\Delta\Phi_n(x_n, y_n)$ represents compensation for optical aberration of high-order terms for an optical system. For example, a part of the optical aberration may result from the substrate 11 on which the $n^{th}$ meta-optical array 2 is formed, where $$\Delta\Phi_n(x_n, y_n) = \frac{2\pi}{\lambda_n}\sum_{i=0}^{\infty}\sum_{j=0}^{\infty}\alpha_{nij}x_n^{2i}y_n^{2j}$$

$$2i + 2j \geq 4, \ i = 0, 1, 2, \ldots \ ; \ j = 0, 1, 2, \ldots$$

and $a_{nij}$ represents a coefficient of the polynomial, which may be acquired using conventional optimization methods (e.g., the damped least squares method). In an ideal condition where the optical system does not have factors that induce optical aberration, $\Delta\Phi_n(x_n, y_n)=0$ (each $a_{nij}$ being zero). In reality, an ordinary optical system usually has optical aberrations of high-order terms, and $\Delta\Phi_n(x_n, y_n)$ can thus be introduced into equation (1) for compensating the optical aberrations of high-order terms (e.g., terms with an order higher than or equal to the fourth-order, namely, $2i+2j\geq 4$). For example, assuming that a plate glass has a thickness of t and a refractive index of $n_{\lambda_n}$, and that light beams passing through the plate glass form an image at a plane which is away from the plate glass by a distance of l, the plate glass will introduce optical aberrations of fourth-order terms ($a_{n20}x^4$, $a_{n11}x^2y^2$, $a_{n02}y^4$). If the optical aberrations occur in an optical system of n=1, the coefficients $a_{120}/a_{111}$ and $a_{102}$ could be $$a_{120} = a_{102} = \frac{1}{2} a_{111} = -\frac{(n_\lambda^2 - 1)t}{8 \, n_\lambda^3 \, l^4}.$$

However, this disclosure is not limited in this respect.

It is noted that the part of "

$$-\frac{2\pi}{\lambda_n}\left(\sqrt{x_n^2 + y_n^2 + f_n^2} - f_n\right)$$

" in equation (1) enables collimation of the $n^{th}$ light beam that is emitted by a light source (not shown) located at a focal point of the $n^{th}$ meta-optical array 2, and the part of "$-2\pi/\lambda_n(-(x_n \cos\theta_n + y_n \sin\theta_n)\sin\gamma_n)$" enables deflection of the $n^{th}$ light beam.

Accordingly, in this embodiment where the meta-optical device includes three meta-optical arrays 2, each of the nanostructures 21 of a first meta-optical array 2 is configured to satisfy an equation of:

$$\Delta\varphi_1(x_1, y_1) = \\ -\frac{2\pi}{\lambda_1}\left(\sqrt{x_1^2 + y_1^2 + f_1^2} - f_1 - (x_1\cos\theta_1 + y_1\sin\theta_1)\sin\gamma_1\right) - \Delta\Phi_1(x_1, y_1)$$

where $x_1$ represents a distance between the nanostructure 21 and the origin (0,0) of the first meta-optical array 2 in the X-direction, $y_1$ represents a distance between the nanostructure 21 and the origin of the first meta-optical array 2 in the Y-direction, $\Delta\varphi_1(x_1, y_1)$ represents a difference between a phase shift to be induced on the first light beam $L_1$ by the nanostructure 21 and a phase shift to be induced on the first light beam $L_1$ by the nanostructure 21 at the origin of the first meta-optical array 2 (thus, $\Delta\varphi_1(0,0)=0$), $\lambda_1$ represents an operating wavelength of the first light beam $L_1$, $f_1$ represents a focal length of the first meta-optical array 2, $\theta_1$ represents an angle between the X-axis and a projection of a first imaging light beam $I_1$ on the X-Y plane, $\gamma_1$ represents an angle between the Z-axis and the first imaging light beam $I_1$, and $\Delta\Phi_1(x_1, y_1)$ represents compensation for optical aberration of high-order terms.

Each of the nanostructures 21 of a second meta-optical array 2 is configured to satisfy an equation of:

$$\Delta\varphi_2(x_2, y_2) = \\ -\frac{2\pi}{\lambda_2}\left(\sqrt{x_2^2 + y_2^2 + f_2^2} - f_2 - (x_2\cos\theta_2 + y_2\sin\theta_2)\sin\gamma_2\right) - \Delta\Phi_2(x_2, y_2)$$

where $x_2$ represents a distance between the nanostructure 21 and the origin (0,0) of the second meta-optical array 2 in the X-direction, $y_2$ represents a distance between the nanostructure 21 and the origin of the second meta-optical array 2 in the Y-direction, $\Delta\varphi_2(x_2, y_2)$ represents a difference between a phase shift to be induced on the second light beam $L_2$ by the nanostructure 21 and a phase shift to be induced on the second light beam $L_2$ by the nanostructure 21 at the origin of the second meta-optical array (thus, $\Delta\varphi_2(0,0)=0$), $\lambda_2$ wavelength of the second represents an operating light beam $L_2$, $f_2$ represents a focal length of the second meta-optical array 2, $\theta_2$ represents an angle between the X-axis and a projection of a second imaging light beam $I_2$ on the X-Y plane, $\gamma_2$ represents an angle between the Z-axis and the second imaging light beam $I_2$, and $\Delta\Phi_2(x_2, y_2)$ represents compensation for optical aberration of high-order terms.

Each of the nanostructures 21 of a third meta-optical array 2 is configured to satisfy an equation of:

$$\Delta\varphi_3(x_3, y_3) = \\ -\frac{2\pi}{\lambda_3}\left(\sqrt{x_3^2 + y_3^2 + f_3^2} - f_3 - (x_3\cos\theta_3 + y_3\sin\theta_3)\sin\gamma_3\right) - \Delta\Phi_3(x_3, y_3)$$

where $X_3$ represents a distance between the nanostructure 21 and the origin (0, 0) of the third meta-optical array 2 in the X-direction, $y_3$ represents a distance between the nanostructure 21 and the origin in the Y-direction, $\Delta\varphi_3(x_3, y_3)$ represents a difference between a phase shift to be induced on the third light beam $L_3$ by the nanostructure 21 and a phase shift to be induced on the third light beam La by the nanostructure 21 at the origin of the third meta-optical array 2 (thus, $\Delta\varphi_3(0,0)=0$), $\lambda_3$ represents an operating wavelength of the third light beam $L_3$, $f_3$ represents a focal length of the third meta-optical array 2, $\theta_3$ represents an angle between the X-axis and a projection of a third imaging light beam $I_3$ on the X-Y plane, $\gamma_3$ represents an angle between the Z-axis and the third imaging light beam $I_3$, and $\Delta\Phi_3(x_3, y_3)$ represents compensation for optical aberration of high-order terms.

In this embodiment, each nanostructure 21 is a nanometer-scaled rectangular column that has a rectangular X-Y cross section (i.e., a cross-section lying on the X-Y plane), and that is made of $TiO_2$. In some embodiments, dimensions of each of the nanostructures 21 of the $n^{th}$ meta-optical array 2 correspond to the operating wavelength of the $n^{th}$ light beam. In some embodiments, each of the nanostructures 21 of the $n^{th}$ meta-optical array 2 has a length (i.e., the length of the rectangular X-Y cross section) ranging from $\lambda_n/30$ to $\lambda_n$, a width (i.e., the width of the rectangular X-Y cross section) ranging from $\lambda_n/30$ to $\lambda_n$, and a height (measured in the Z-direction) ranging from to $\lambda_n/100$ to $2\lambda_n$. If the dimensions of the nanostructure 21 fall outside of the above ranges, the nanostructure 21 may have a low output efficiency.

In some variations of this embodiment, each nanostructure 21 may be a nanometer-scaled column that has the X-Y cross section of a square, a circle, or other types of polygon (e.g., a triangle, a pentagon, a hexagon, etc.), and may either be a solid column or a hollow column, as long as it is configured to satisfy equation (1), Table 1 exemplarily shows some relationships between dimensions of a nanostructure 21 and a phase shift induced on a light beam by the nanostructure 21, where the x-width refers to a width in the X-axis direction, the y-width refers to a width in the Y-axis direction, the x-polarization phase shift refers to a polarization phase shift in the X-axis direction of the nanostructure 21, and the y-polarization phase shift refers to polarization phase shift in the Y-axis direction of the nanostructure 21. The relationships may be related to the material of the substrate 11, the material of the meta-optical array 2, the shape of the X-Y cross section of the nanostructure 21, the height, the array period (i.e., a distance between centers of adjacent nanostructures 21, which may range, for example but not limited to, from $\lambda_n/30$ to $\lambda_n$), and the structure (e.g., solid or hollow) of the nanostructure 21, etc. In this embodiment, the substrates 11 are made of $SiO_2$, the array period is 210 nm, and the nanostructures 21 are made of $TiO_2$ and have the same height of 750 nm for ease of manufacturing. However, it is not necessary for the nanostructures 21 to have the same height in other embodiments.

TABLE 1

| Nanostructure | x-width (nm) | y-width (nm) | x-polarization phase shift (degree) | y-polarization phase shift (degree) |
|---|---|---|---|---|
| Nanostructure for 1st light beam $L_1$ (operating wavelength: 640 nm) | 50 | 50 | 17.7 | 17.7 |
| | 50 | 100 | 34.1 | 51.5 |
| | 50 | 150 | 45.5 | 106.3 |
| | 100 | 50 | 51.5 | 34.1 |
| | 100 | 100 | 97.1 | 97.1 |
| | 100 | 150 | 129.6 | 194.2 |
| Nanostructure for 2nd light beam $L_2$ (operating wavelength: 520 nm) | 50 | 50 | 24.9 | 24.9 |
| | 50 | 100 | 46.8 | 74.3 |
| | 50 | 150 | 61.9 | 159.6 |
| | 100 | 50 | 74.3 | 46.8 |
| | 100 | 100 | 146.5 | 146.5 |
| | 100 | 150 | 199.5 | 301.3 |
| Nanostructure for 3rd light beam $L_3$ (operating wavelength: 450 nm) | 50 | 50 | 33.6 | 33.6 |
| | 50 | 100 | 62.9 | 108.3 |
| | 50 | 150 | 82.9 | 242.0 |
| | 100 | 50 | 108.3 | 62.9 |
| | 100 | 100 | 226.2 | 226.2 |
| | 100 | 150 | 315.2 | 107.9 |

It is noted that this disclosure is not limited to the numbers listed in Table 1, and one skilled in the art would know how to determine the dimensions of the nanostructures for a desired phase shift.

In Table 1, the relationships between the phase shift and the nanostructure 21 are presented using the dimensions of the nanostructure 21 and the polarization phase shifts to be induced in an x-direction (i.e., the lengthwise direction of the nanostructure 21) and a y-direction (i.e., the widthwise direction of the nanostructure 21). In some embodiments, the Pancharatnam-Berry phase can be used to define the phase shift for left-handed circularly polarized light and/or right-handed circularly polarized light, and the phase shift is related to not only geometric dimensions but also an orientation of the nanostructure 21.

The meta-optical device of the embodiment may be produced with the following steps.

In the first step, for each of the meta-optical arrays 2, $\Delta\varphi_n(x_n, y_n)$ is calculated for each nanostructure 21 of the meta-optical array 2 using equation (1), and dimensions of the nanostructure 21 at the origin (0,0) are determined, so the phase shift $\varphi_n(0,0)$ to be induced by the nanostructure 21 at the origin (0,0) is known. Then, the desired phase shift $\varphi_n(x_n, y_n)$ to be induced by each nanostructure 21 of the meta-optical array 2 can be calculated by adding $\Delta\varphi_n(x_n, y_n)$ to $\varphi_n(0,0)$. Based on the desired phase shift $\varphi_n(x_n, y_n)$: dimensions of the corresponding nanostructure 21 can be determined, as exemplified in Table 1. For example, if the X-Y cross section of the nanostructure 21 at the origin of the meta-optical array 2 has a length of 50 nm and a width of 100 nm, $\varphi_n(0,0)$ would be 34.1° for the x-polarization and $\varphi_n(0,0)$ would be 51.5° for the y-polarization, In such a case, when $\Delta\varphi_n(x_n, y_n)$ calculated for a nanostructure 21 at a position $(x_n, y_n)$ is 11.4 degrees, the desired phase shift $\varphi_n(x_n, y_n)$ of the nanostructure 21 can be calculated as being either 45.5 (=34.1+11. 4) degrees for the x-polarization or 62.9 (=51.5+11.4) degrees for the y-polarization, depending direction the on which designer wishes the phase shift to occur in. Based on $\varphi_n(x_n, y_n)$, one skilled in the art can calculate the required dimensions of the nanostructure 21 based on the materials of the substrate 11 and the meta-optical array 2, the shape of the X-Y cross section of the nanostructure 21, and the structure of the nanostructure 21. In the abovementioned example, the nanostructure 21 can be configured to have a length of 50 nm, a width of 150 nm, an array period of 210 nm and a height of 750 nm to achieve the desired phase shift of $\varphi_n(x_n, y_n)$=45.5° for the x-polarization according to Table 1.

In the second step, three substrates 11 that are made of $SiO_2$ are prepared, and semiconductor manufacturing techniques are used to form the nanostructures 21 that are made of $TiO_2$ on the substrates 11 according to the dimensions of the nanostructures 21 obtained in the first step, so as to create the meta-optical arrays 2 on the substrates 11, respectively. One skilled in the art should be familiar with such a semiconductor manufacturing process, so details thereof are omitted herein for the sake of brevity.

The performance of the embodiment is provided hereinafter by comparison with a reference meta-optical device that has no deflection ability. In the following simulation experiments, the meta-optical arrays 2 of the meta-optical device of this embodiment are configured to collimate and deflect light beams $L_1$-$L_3$ onto the same position (a predetermined position) of the same plane (i.e., an imaging plane). After locations of light sources (not shown) that emit the light beams $L_1$, $L_2$, $L_3$ and the output imaging location the aforesaid (i.e., predetermined position) are determined, the corresponding angles $\theta_1$, $\gamma_1$, $\theta_2$, $\gamma_2$, $\theta_3$, $\gamma_3$ can be calculated.

Figure 7:
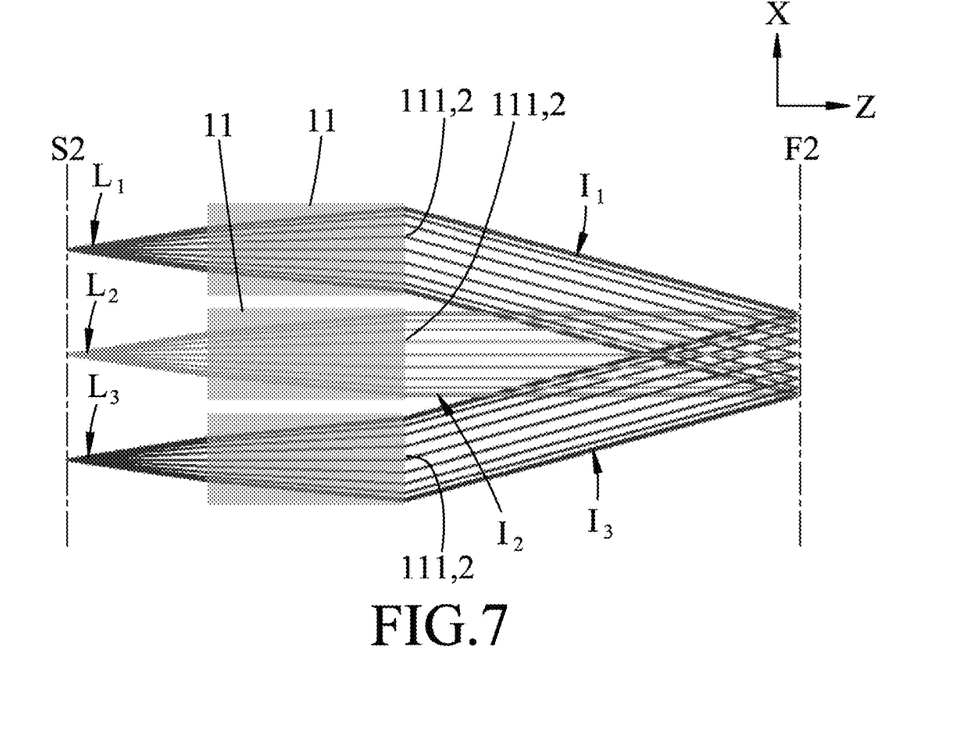
FIG. 7 is a schematic diagram showing optical paths of a first simulation experiment that uses a meta-optical device of the embodiment.

In the first simulation experiment, the meta-optical device of this embodiment is configured to have the angle $\theta_1$ between a projection of the first imaging light beam $I_1$ on the X-Y plane and the X-axis equal 180°, the angle $\gamma_1$ between the first imaging light beam $I_1$ and the Z-axis equal 15°, the angle $\theta_2$ between a projection of the second imaging light beam $I_2$ on the X-Y plane and the X-axis equal 0°, the angle $I_2$ between the second imaging light beam $I_2$ and the Z-axis equal 0°, the angle $\theta_3$ between a projection of the third imaging light beam $I_3$ on the X-Y plane and the X-axis equal 0°, and the angle $Y_3$ between the third imaging light beam $I_3$ and the Z-axis equal 15°.

Figure 10:
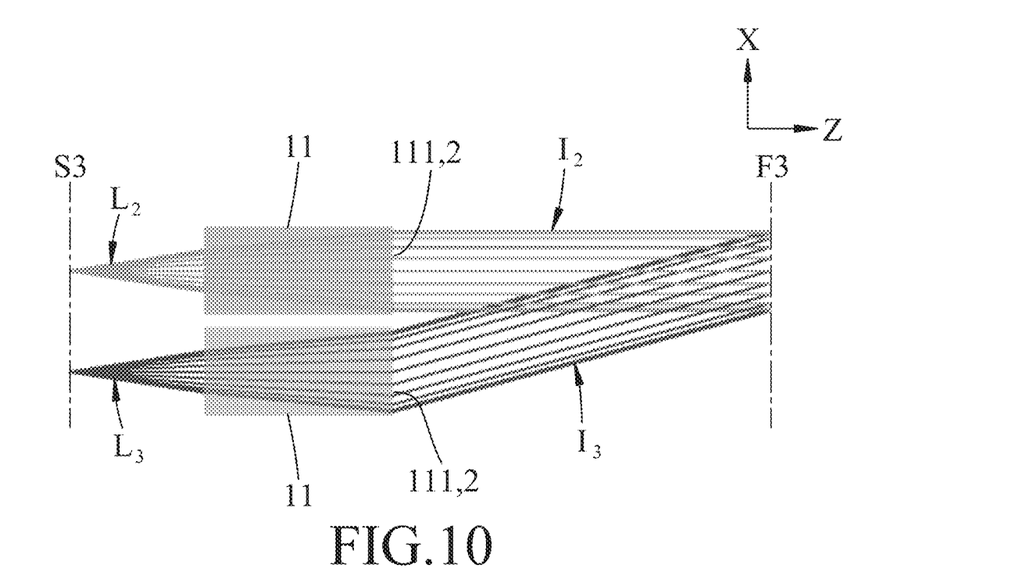
FIGS. 10 and 11 are schematic diagrams showing optical paths of a second simulation experiment that uses a meta-optical device of the embodiment.
Figure 11:
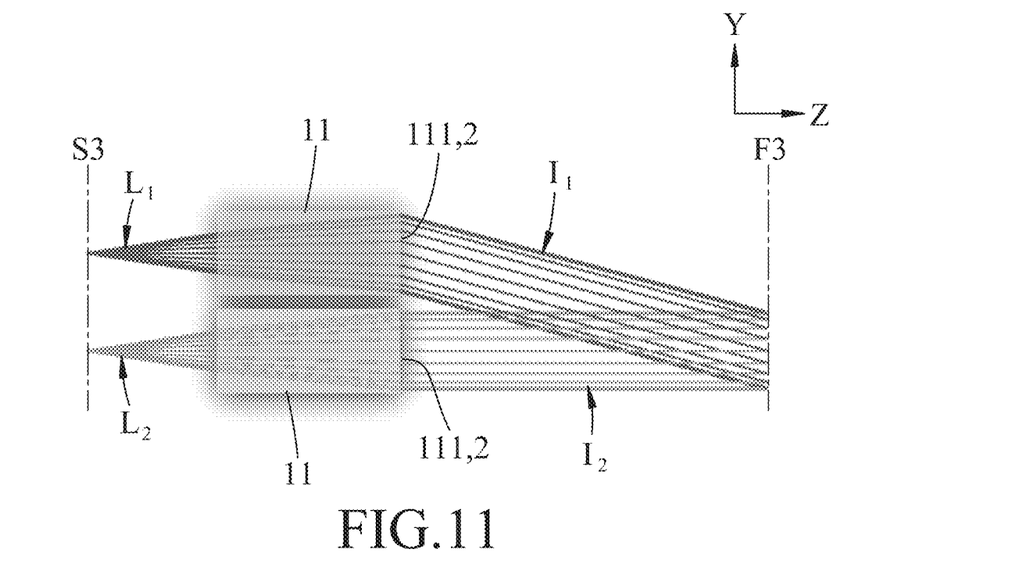

In the second simulation experiment, the meta-optical device of this embodiment is configured to have the angle $\theta_1$ between a projection of the first imaging light beam $I_1$ on the X-Y plane and the X-axis equal 90°, the angle $\gamma_1$ between the first imaging light beam $I_1$ and the Z-axis equal 15°, the angle $\theta_2$ between a projection of the second imaging light beam $I_2$ on the X-Y plane and the X-axis equal 0°, the angle $\gamma_2$ between the second imaging light beam $I_2$ and the Z-axis equal 0°, the angle $\theta_3$ between a projection of the third imaging light beam $I_3$ on the X-Y plane and the X-axis equal 0°, and the angle $\gamma_3$ between the third imaging light beam $I_3$ and the Z-axis equal 15°.

Figure 14:
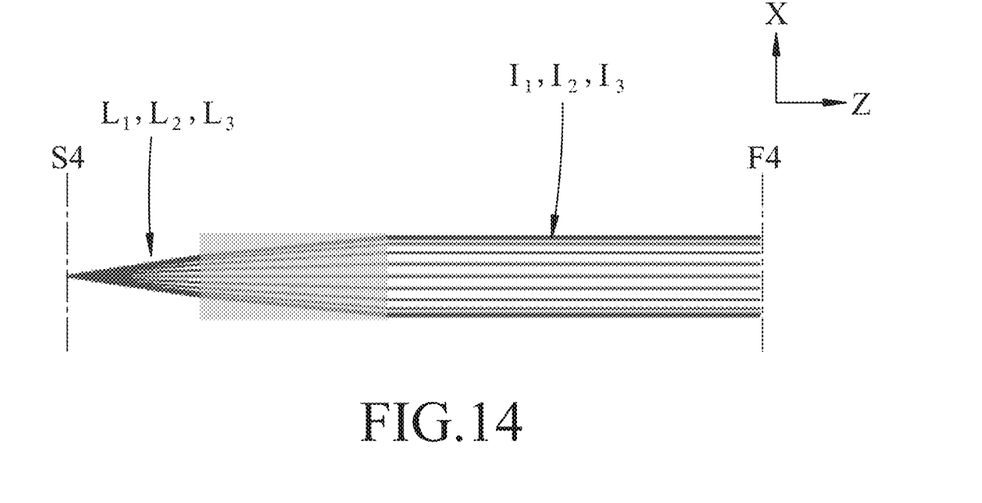
FIGS. 14 and 15 are schematic diagrams showing optical paths of a third simulation experiment that uses a meta-optical device of the embodiment.
Figure 15:
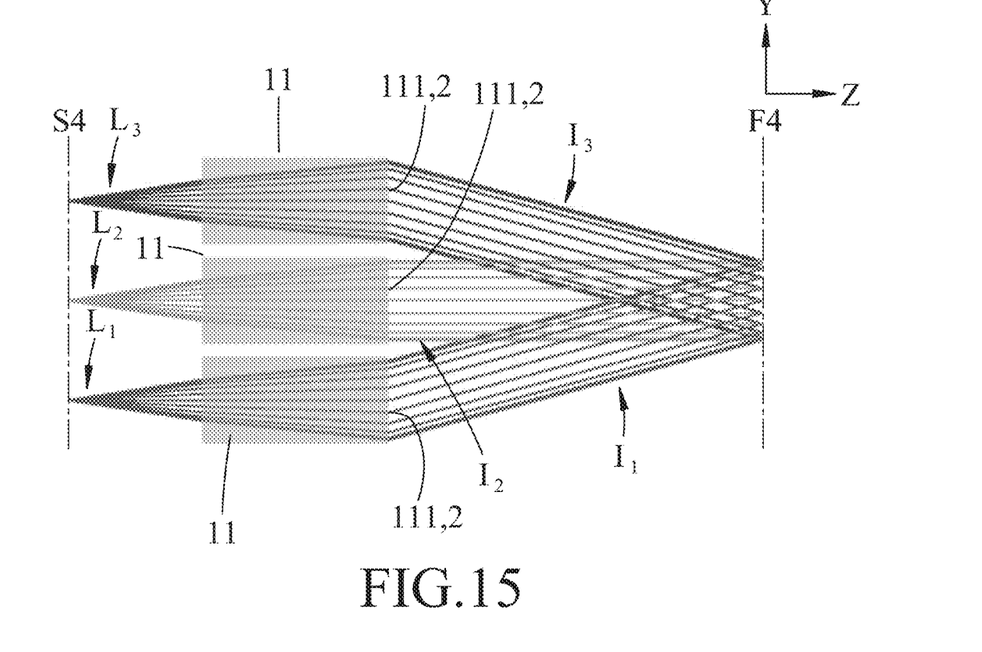

In the third simulation experiment, the meta-optical device of this embodiment is configured to have the angle $\theta_1$ between a projection of the first imaging light beam $I_1$ on the X-Y plane and the X-axis equal 90°, the angle $\gamma_1$ between the first imaging light beam $I_1$ and the Z-axis equal 15°, the angle $\theta_2$ between a projection of the second imaging light beam $I_2$ on the X-Y plane and the X-axis equal 0°, the angle 12 between the second imaging light beam $I_2$ and the Z-axis equal 0°, the angle $\theta_3$ between a projection of the third imaging light beam $I_3$ on the X-Y plane and the X-axis equal 90°, and the angle $\gamma_3$ between the third imaging light beam $I_3$ and the Z-axis equal 15°.

Table 2 lists focal lengths $f_n$ of the meta-optical arrays 2 and operating wavelengths of the light beams $L_1$, $L_2$, $L_3$ used in these simulation experiments. The focal lengths $f_n$ of the meta-optical arrays 2 are positively correlated with the operating wavelengths $\lambda_n$ of the corresponding light beams (i.e., the greater the wavelength $\lambda_n$, the greater the focal length $f_n$).

TABLE 2

| | |
|---|---|
| Focal length ($f_1$) of $1^{st}$ meta-optical array | 2.101 mm |
| Focal length ($f_2$) of $2^{nd}$ meta-optical array | 2.097 mm |
| Focal length ($f_3$) of $3^{rd}$ meta-optical array | 2.0293 mm |
| Operating wavelength $\lambda_1$ of $1^{st}$ light beam $L_1$ | 640 nm (red light) |
| Operating wavelength $\lambda_2$ of $2^{nd}$ light beam $L_2$ | 520 nm (green light) |
| Operating wavelength $\lambda_3$ of $3^{rd}$ light beam $L_3$ | 450 nm (blue light) |

It is noted that the meta-optical devices of the embodiment used in the simulation experiments and the reference meta-optical device used in a reference simulation experiment to serve as a comparative example have the same diameter and the same focal lengths with respect to the meta-optical arrays, where the reference meta-optical device conforms to $$\Delta \varphi_n(x_n, y_n) = -\frac{2\pi}{\lambda_n}\left(\sqrt{x_n^2 + y_n^2 + f_n^2} - f_n\right).$$

Figure 3:
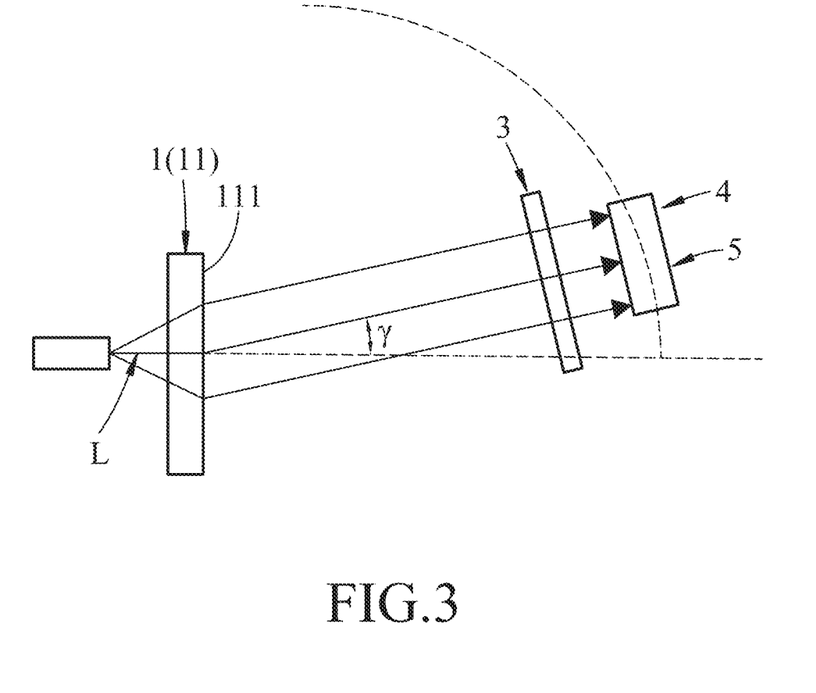
FIG. 3 is a schematic diagram illustrating an optical measurement system to measure used collimated and deflected light beams outputted by the embodiment.

In these simulation experiments, distribution of intensity of the first, second and third imaging beams $I_1$, $I_2$, $I_3$ can be measured using an optical measurement system that may include a polarizer 3, a wavefront sensor 4 and a laser beam profiler 5. The wavefront sensor 4 can be used to measure wavefront errors of the imaging light beams that pass through the polarizer 3 to acquire quality of collimation, and the laser beam profiler 5 can be used to precisely measure angular errors of the imaging light beams that pass through the polarizer 3. Details of measurement can be derived by one skilled in the art from the above descriptions, and are thus omitted herein for the sake of brevity.

Table 3 lists correspondences between the drawings and the experimental conditions, and correspondences between the drawings and experimental results of the reference simulation experiment and the first to third simulation experiments.

TABLE 3

Figure 4:
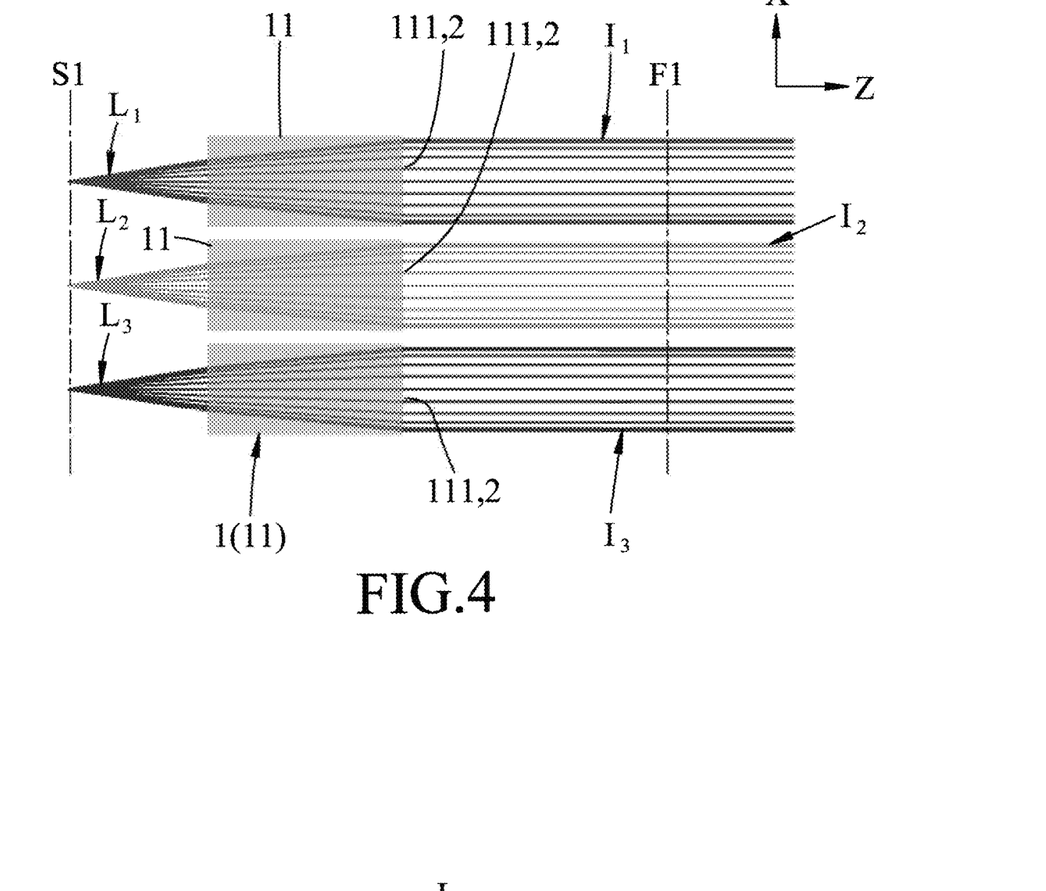
FIG. 4 is a schematic diagram showing optical paths of a reference simulation experiment that uses a reference meta-optical device.
Figure 5:
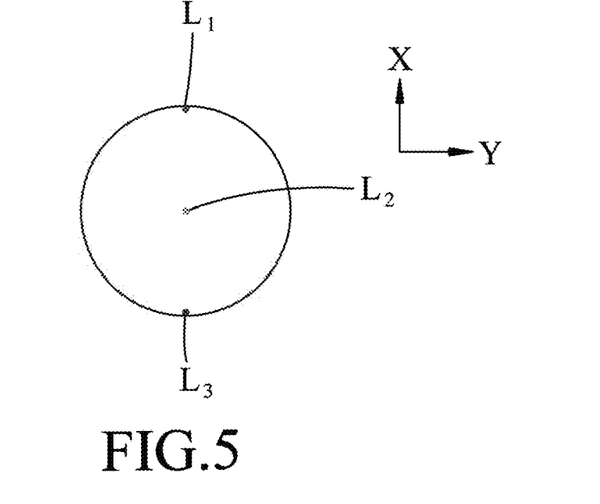
FIG. 5 is a schematic diagram showing a footprint of incident light beams on a plane S1 in the reference simulation experiment.
Figure 6:
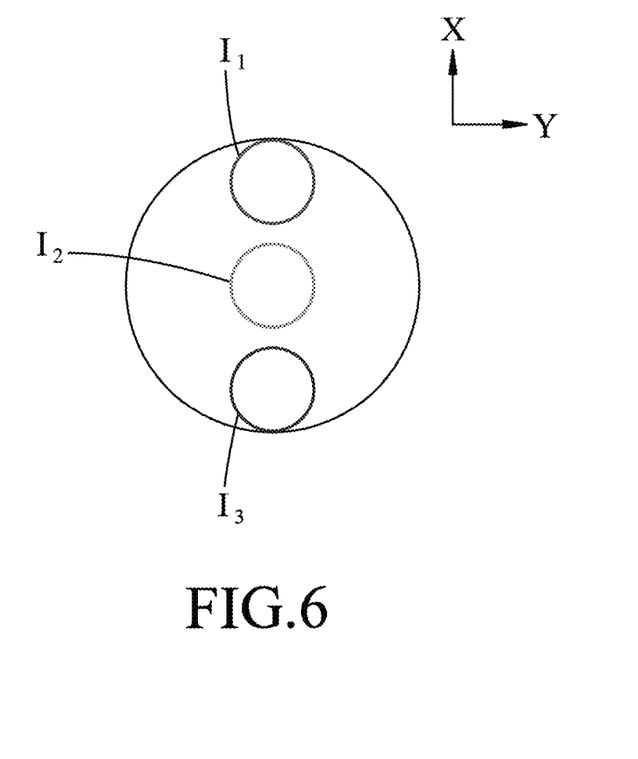
FIG. 6 is a schematic diagram showing a footprint of imaging light beams on a plane F1 in the reference simulation experiment.
Figure 8:
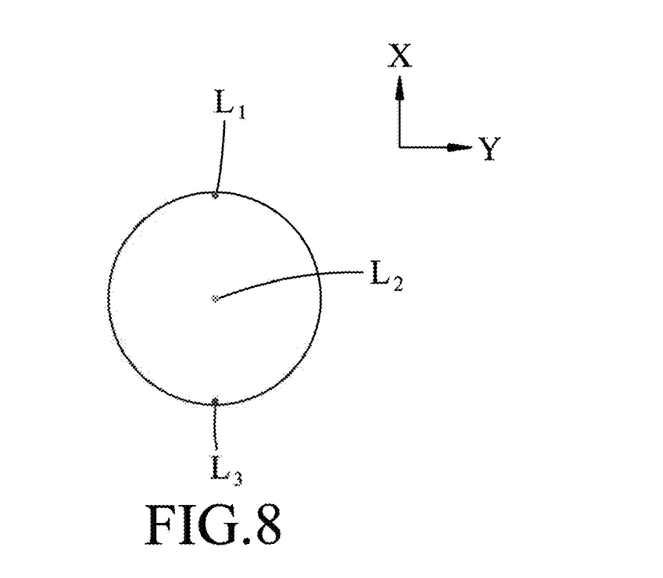
FIG. 8 is a schematic diagram showing a footprint of incident light beams on a plane S2 in the first simulation experiment.
Figure 9:
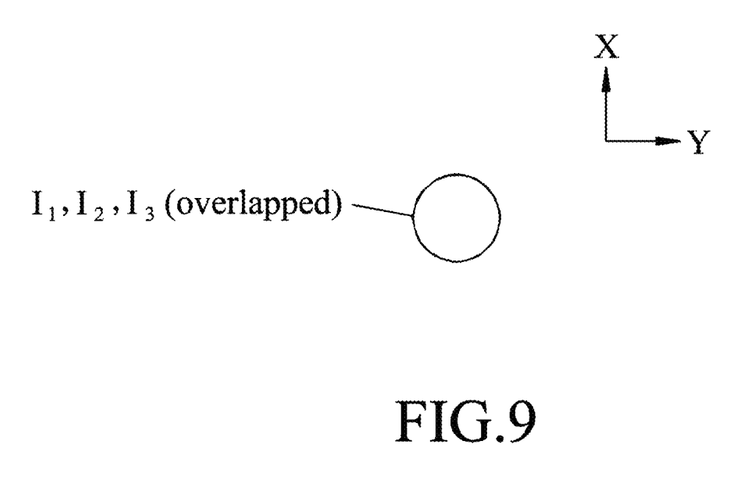
FIG. 9 is a schematic diagram showing a footprint of imaging light beams on a plane F2 in the first simulation experiment.
Figure 12:
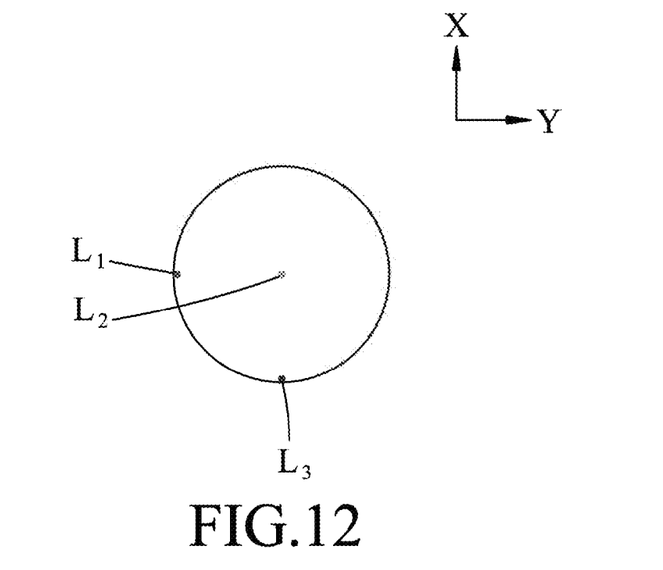
FIG. 12 is a schematic diagram showing a footprint of incident light beams on a plane S3 in the second simulation experiment.
Figure 13:
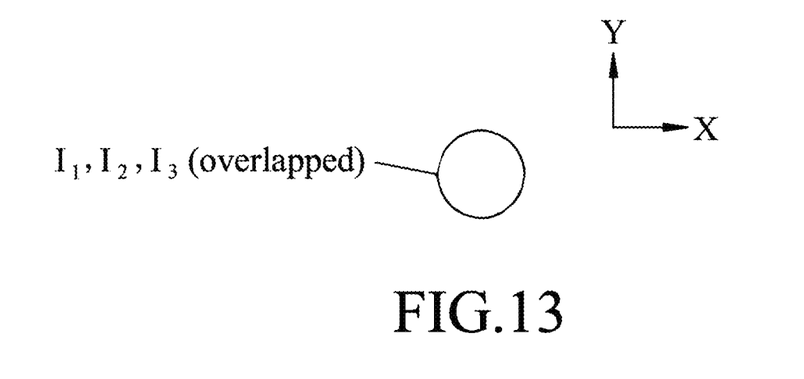
FIG. 13 is a schematic diagram showing a footprint of imaging light beams on a plane F3 in the second simulation experiment.
Figure 16:
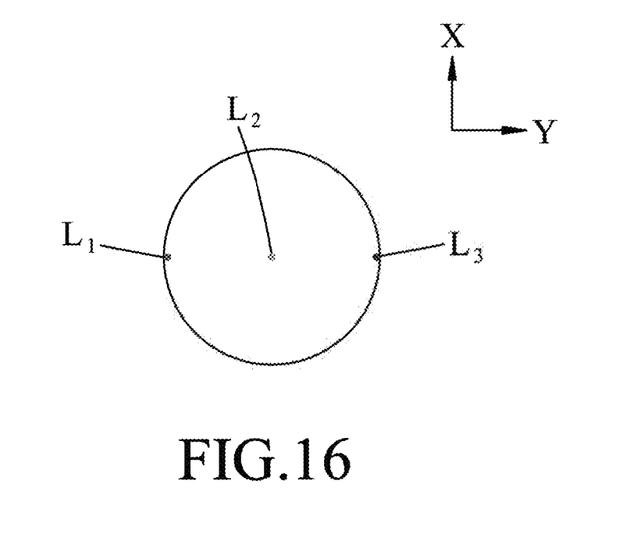
FIG. 16 is a schematic diagram showing a footprint of incident light beams on a plane S4 in the third simulation experiment.
Figure 17:
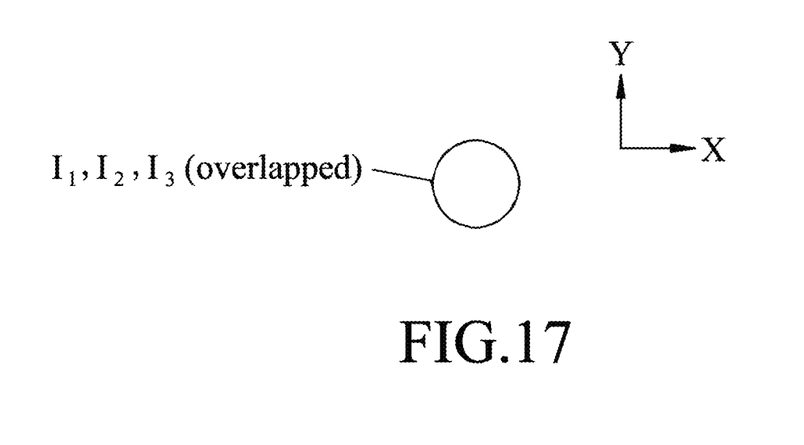
FIG. 17 is a schematic diagram showing a footprint of imaging light beams on a plane F4 in the third simulation experiment.

| | Reference Experiment | Experiment 1 | Experiment 2 | Experiment 3 |
|---|---|---|---|---|
| Light source arrangement | FIG. 4 | FIG. 7 | FIG. 10 & FIG. 11 | FIG. 14 & FIG. 15 |
| Footprint of incident light beams on plane S1/S2/S3/S4 | FIG. 5 | FIG. 8 | FIG. 12 | FIG. 16 |
| Footprint of imaging light beams on plane F1/F2/F3/F4 | FIG. 6 | FIG. 9 | FIG. 13 | FIG. 17 |

Referring to FIGS. 4 to 6, since the first, second and third light beams $L_1$, $L_2$, $L_3$ pass through the reference meta-optical device that does not deflect light beams, the first, second and third imaging light beams $I_1$, $I_2$, $I_3$ are projected onto three separate positions of the imaging plane F1, as shown in FIG. 6. On the other hand, FIGS. 9, 13 and 17 show that the first, second and third imaging light beams $I_1$, $I_2$, $I_3$ are projected onto the same position of the same plane, proving that the meta-optical device that satisfies equation (1) can collimate and deflect the first, second and third light beams $L_1$, $L_2$, $L_3$.

To sum up, the meta-optical device of the according to this disclosure uses the embodiment meta-optical arrays 21 that include the the desired optical nanostructures 21 to induce effect, i.e., collimating and deflecting the incident light beams, while the overall size of the meta-optical device can still be small in comparison to traditional optical systems. In addition, the meta-optical device of the embodiment according to this disclosure can be made using a mature semiconductor manufacturing process, SO the processing difficulty s low and the processing precision is high.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A meta-optical device for collimating and deflecting a light beam, comprising:
    a substrate assembly having a substrate assembly surface that extends in an X-Y plane defined by an X-axis extending in an X-axis direction and a Y-axis extending in a Y-axis direction, wherein the X-direction and the Y-direction are perpendicular to each other; and
    N number of meta-optical arrays that are formed on said substrate assembly surface and that are disposed to receive N number of light beams, respectively, wherein N is a positive integer not smaller than two, and each of said meta-optical arrays includes a plurality of nanostructures that are arranged in an array and that extend in a Z-direction in which a Z-axis extends and which is perpendicular to said substrate assembly surface;
    wherein for an $n^{th}$ meta-optical array that is an $n^{th}$ one of said meta-optical arrays, that is disposed to receive an $n^{th}$ light beam which is an $n^{th}$ one of the light beams and that manipulates the $n^{th}$ light beam into an $n^{th}$ imaging light beam, an origin of said $n^{th}$ meta-optical array is defined to be an intersection of an optical axis of the $n^{th}$ light beam and said $n^{th}$ meta-optical array, and each of said nanostructures thereof is configured to have a parameter $\Delta\Phi_n(x_n, y_n)$ relating to:

$$-\frac{2\pi}{\lambda_n}\left(\sqrt{x_n^2+y_n^2+f_n^2}-f_n-(x_n\cos\theta_n+y_n\sin\theta_n)\sin\gamma_n\right)$$

where n is a variable that takes on a positive integer value ranging from 1 to N, $x_n$ represents a distance between said nanostructure and the origin of said $n^{th}$ meta-optical array in the X-direction, $y_n$ represents a distance between said nanostructure and the origin of said $n^{th}$ meta-optical array in the Y-direction, $\Delta\varphi_n(x_n, y_n)$ represents a difference between a phase shift to be induced on the $n^{th}$ light beam by said nanostructure and a phase shift to be induced on the $n^{th}$ light beam by one of said nanostructures that is located at the origin of said $n^{th}$ meta-optical array, $\lambda_n$ represents an operating wavelength of the $n^{th}$ light beam, $f_n$ represents a focal length of said $n^{th}$ meta-optical array, $\theta_n$ represents an angle between the X-axis and a projection of the $n^{th}$ imaging light beam on the X-Y plane, and $\gamma_n$ represents an angle between the Z-axis and the $n^{th}$ imaging light beam;

wherein the focal lengths of said N number of meta-optical arrays are different from each other, and the operating wavelengths of the N number of the light beams are different from each other; and wherein the light beams are deflected onto a same position of a same plane after passing through a first to $N^{th}$ meta-optical arrays, respectively.

2. The meta-optical device of claim 1, wherein each of said nanostructures of the $n^{th}$ meta-optical array satisfies an equation of:

$$\Delta\varphi_n(x_n, y_n) = -\frac{2\pi}{\lambda_n}\left(\sqrt{x_n^2+y_n^2+f_n^2}-f_n-(x_n\cos\theta_n+y_n\sin\theta_n)\sin\gamma_n\right)-\Delta\Phi_n(x_n, y_n)$$

where $\Delta\Phi_n(x_n, y_n)$ represents compensation for optical aberration of high-order terms.

3. The meta-optical device of claim 1, wherein N=3.

4. The meta-optical device of claim 1, wherein each of said nanostructures of each of said meta-optical arrays has a height ranging from $\lambda_n/100$ to $2\lambda_n$ in the Z-direction, and a rectangular cross section lying on the X-Y plane;

wherein said rectangular cross section has a length ranging from $\lambda_n/30$ to $\lambda_n$, and a width ranging from $\lambda_n/30$ to $\lambda_n$.

5. The meta-optical device of claim 1, wherein $f_n$ is correlated with $\lambda_n$.

6. The meta-optical device of claim 1, wherein $f_n$ is positively correlated with $\lambda_n$.

7. The meta-optical device of claim 1, being a lens component to be disposed in an optical engine of a projector.

8. The meta-optical device of claim 1, wherein said substrate assembly includes only one substrate that has a substrate surface serving as said substrate assembly surface.

9. The meta-optical device of claim 1, wherein said substrate assembly includes N number of substrates each having a substrate surface on which a respective one of said meta-optical arrays is formed, wherein N number of substrates is not smaller than two; and wherein said substrate surfaces of said substrates cooperatively define said substrate assembly surface.

\* \* \* \* \*